July 27, 1937.  W. WRIGHT  2,088,126
BEARING PLATE FOR BRAKES
Filed Dec. 19, 1932
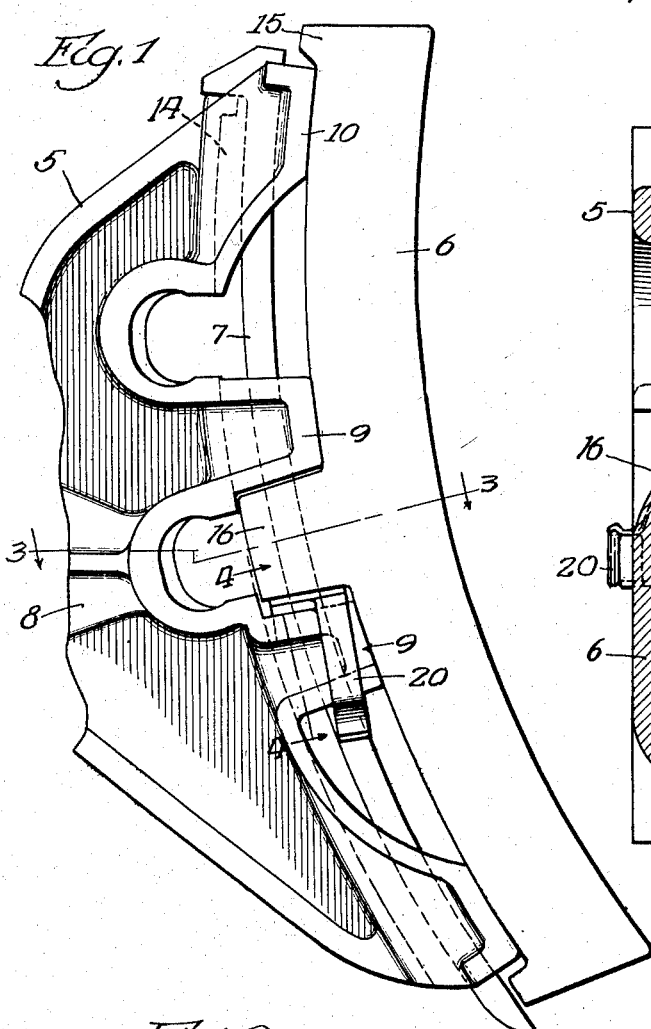
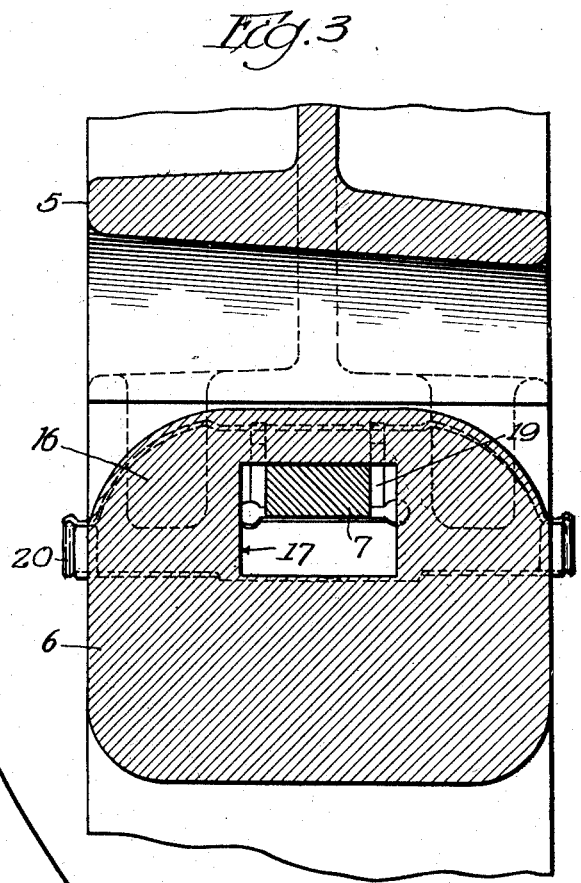
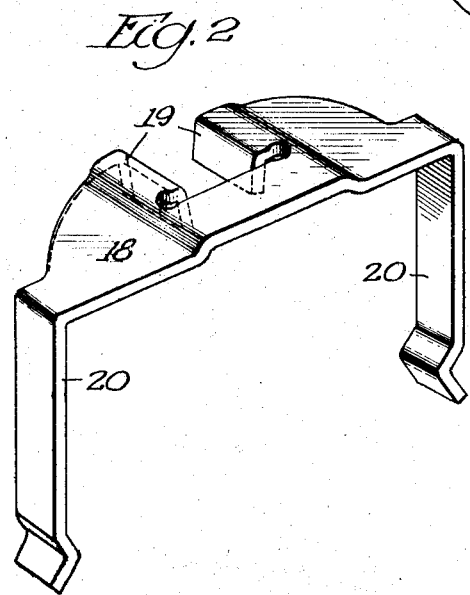
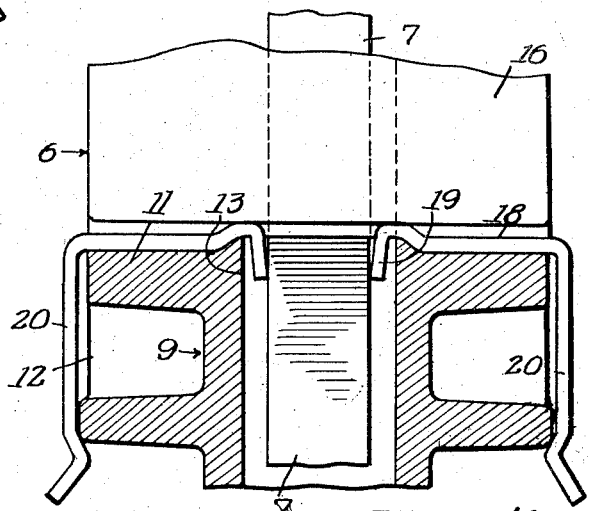
Inventor
William Wright
By Fred Gerlach
Atty Patented July 27, 1937

2,088,126

UNITED STATES PATENT OFFICE 2,088,126

BEARING PLATE FOR BRAKES

William Wright, Chicago, Ill., assignor to T-Z Railway Equipment Company, Chicago, Ill., a corporation of Illinois Application December 19, 1932, Serial No. 647,840

6 Claims. (Cl. 188—243)

The present invention relates generally to brakes for railway cars and other rolling stock. More particularly, the invention relates to that type of brake which is designed to be applied directly to one of the wheels of the car with which it is used and comprises (1) a vertically elongated head which is adapted to be shifted pneumatically or otherwise in a substantially horizontal direction towards the wheel for braking purposes, and has on the inner face thereof, that is, the face nearest the wheel, a pair of vertically spaced, centrally apertured lugs; (2) an arcuate brake shoe which is curved conformably to, and fits directly against, the periphery of the wheel and has a centrally apertured lug adjacent and fitting between the two lugs on the inner face of the head; and (3) an elongated brake shoe key which extends longitudinally between the shoe and the head and passes through the apertures in the lugs so as to connect removably the shoe to the brake head.

In the manufacture of brakes of this type, it is customary to provide clearance between the sides of the lug on the brake shoe and the contiguous or adjoining side faces of the lugs on the head, so as to permit of ready disposition of the lug on the shoe between the two lugs on the head and to insure proper connection of the shoe and the head. Because of this clearance, the brake shoe is subjected to a certain amount of jarring when the car with which the brake is used travels over rough tracks or terrain. In practice it has been found that this jarring of the brake shoe causes the lugs on the head to wear away quickly and necessitates constant replacing of the head. It has also been found that this jarring of the brake shoe with respect to the head sometimes causes the key to work itself out of its operative position with the result that the shoe is released from the head and becomes lost.

One object of the present invention is to provide for use in connection with a brake of the aforementioned type, a plate which is designed to fit between the brake shoe lug and the lowermost lug on the head, serves to eliminate wearing away of the last mentioned lug and the resultant constant replacement of the brake head and embodies means for preventing the key from being forced out of its operative position by jarring of the brake shoe.

Another object of the invention is to provide a plate of this character in which the means for securing in place the brake shoe key consists of a pair of tongues which fit within the aperture in the lowermost lug of the brake head and engage frictionally the sides of the key.

A further object of the invention is to provide a plate of the character here under consideration which embodies at the ends thereof a pair of fingers for engaging the sides of the lowermost lug of the brake head and hold the plate in place.

A still further object of the invention is to provide a wear-absorbing plate for brake lugs which may be manufactured at a low and reasonable cost, is generally of new and improved construction and may be readily assembled with respect to the brake.

Other objects of the invention and the various advantages and characteristics of the present plate construction will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a side elevation of a brake having applied thereto a wear-absorbing and key-holding plate embodying the invention;

Figure 2 is a perspective of the plate;

Figure 3 is a horizontal section taken on the line 3—3 of Figure 1 and illustrating in detail the manner in which the spring tongues of the plate grip the sides of the key in order to hold the key from jarring loose from its operative position; and Figure 4 is a vertical section taken on the line 4—4 of Figure 1 and showing the manner in which the fingers at the ends of the plate grip the side of the lug on the brake head so as to hold the plate in its operative position.

The plate which forms the subject matter of the invention is adapted for use in connection with a brake for a railroad car or like vehicle. This brake, as shown in the drawing, consists of a head 5, an arcuate shoe 6 and a brake shoe key 7, and is adapted to be applied directly to one wheel of the car. The head 5 is vertically elongated and is adapted as well understood in the art, to be shifted pneumatically or otherwise in a substantially horizontal direction towards the car wheel for braking purposes. A hub part 8 for connecting the head to the shifting mechanism is formed integrally with the central portion of the head. The inner face of the head, that is, the face nearest the wheel, is provided at the central portion thereof with a pair of vertically spaced lugs 9 and embodies at its ends a pair of lugs 10. The lugs 9 are hollow, as shown in Figure 4, and embody oppositely facing side walls 11 and end walls 12. The side walls diverge in the direction of the hub part 8 and embody aligned, rectangular apertures 13. The lugs 10 are formed similarly to the lugs 9 and have longitudinal apertures 14 which are aligned with the apertures 13 in the side walls of the lugs 9. The brake shoe 6 is connected, as hereinafter described, to the inner face of the head and is curved conformably to the periphery of the car wheel to which the brake is applied. It is adapted in response to horizontal shift of the brake head to engage directly the car wheel for braking purposes, and embodies at the ends thereof lateral projections 15 which lap the outer ends of the lugs 10. A lug 16 is formed integrally with the brake shoe and fits between the lugs 9 of the head 5. This lug is outwardly tapered and is provided with an aperture 17. The latter, as shown in Figure 4 of the drawing, is aligned with the apertures 13 in the side walls 11 of the lugs 9. The ends of the lug 16 are rounded, as shown in Figure 3 of the drawing, and there is clearance between the sides of the lug and the contiguous or adjoining faces of the side walls 11 of the lugs 9 in order to permit of ready disposition of the lug 16 between the lugs 9. The brake shoe key 7 is curved in the same manner as the shoe 6 and extends vertically between the shoe and the brake head and through the apertures in the lugs 9, 10 and 16, in order to hold the shoe and head in connected relation. The upper end of the key is bent at right angles so as to form a stop whereby the key is held against downward displacement from its operative position.

The plate is interposed between the bottom side of the lug 16 and the contiguous side face of the side wall 11 of the lowermost lug 9 and serves to prevent said lowermost lug from wearing away when the shoe is jarred with respect to the brake head as the result of the car to which the brake is applied travelling over rough tracks or terrain. It is preferably formed from strip steel and consists of an elongated body 18. One side of this body is straight and fits against the brake shoe at the juncture of the lower side face of the lug 16 with the outer face of the shoe, and the other side of the plate body is curved at the end portions thereof so that the body is the same in cross sectional shape as the contiguous side of the lug 16. The central portion of the body is cut inwardly from the side with the curved end portions and then at right angles in both directions so as to form a pair of oppositely facing tongues 19. These tongues are bent downwardly so that they extend into the aperture 13 in the side wall of the lowermost lug and engage frictionally the sides of the brake shoe key 8 so as to hold the key in place and prevent it from jarring itself loose. By virtue of the fact that the tongues 19 are formed on the plate, the plate serves not only as a wear-absorbing liner for the lowermost lug 9 but also as a means for holding in place the brake shoe key. The tongues 19 are bent downwardly in such a manner that they bear against the sides of the key with considerable pressure and by virtue of the spring action which is an inherent part thereof, preclude accidental release or removal of the key from the apertures of the lugs 9, 10, and 16. The central portion of the body is deflected upwardly with respect to the end portions in order to accommodate and conform to the usual boss which extends around the key aperture in the lowermost lug 9.

In order to hold the plate in place and connected relation with respect to the lowermost lug 9, the ends of the plate body 18 are shaped to form fingers 20. These two fingers are bent downwardly as shown in the drawing, and engage yieldably and frictionally the end walls 12 of the lowermost lug 9. The length of the fingers is such that the distal ends thereof project beyond the lower edges of the side walls of the lowermost lug and these distal ends are bent inwardly and outwardly so as to grip the inner edges of the side walls of said lowermost lug. By employing the fingers 20, the plate is securely held in its operative position.

In assembling the brake, the plate is first applied to the lowermost lug 9 by applying the plate body against the top face of the side wall 11 of the lug and forcing the plate downwardly so as to bring the tongues 19 into the aperture 13 and to snap the fingers 20 into interlocked relation with the side walls 12 of the lowermost lug. After the plate is properly positioned, the brake shoe is connected to the head by positioning the lug 16 between the two lugs 9 of the head and driving the key 7 downwardly through the apertures in the lugs 9, 10 and 16. When the key is in its operative position, the tongues 19 engage the sides thereof as previously pointed out, and prevent accidental removal of the key. In the event that the brake is subjected to any jarring, the plate, instead of the lowermost lug 9, absorbs the wear and hence it is not necessary to replace the brake head at frequent intervals as is generally the custom when no bearing plate is employed.

The herein disclosed bearing plate may be manufactured at a low cost in that it may be stamped from strip steel and readily applied to brakes of standard design. It is exceedingly well suited for use in connection with the brake of a coal car in that it prevents displacement of the brake shoe key in the event that the car is tilted as is sometimes done in connection with coal dumping or discharging.

Whereas the plate has been described as being punched or stamped from strip steel, it is to be understood that malleable iron or any other suitable material may be used in the fabrication of the plate. It is also to be understood that the invention is not to be restricted to the details set forth, since these may be modified within the scope of the appended claims, without departing from the spirit and scope of the invention.

Having thus described the invention, what I claim as new and desire to secure by Letters Patent, is:

1. The combination with a brake head and shoe having a pair of apertured lugs attached respectively thereto and arranged in overlapped relation, and a key extending longitudinally between the head and shoe and through the apertures in the lugs and serving in conjunction with the lugs to hold the shoe and head in connected relation, of a wear plate fitting between opposing faces of the lugs and embodying a pair of oppositely facing tongues engaging frictionally the sides of the key and operating to hold the key against longitudinal displacement.

2. The combination with a brake head and shoe having a pair of apertured lugs attached respectively thereto and arranged in overlapped relation, and a key extending longitudinally between the head and shoe and through the apertures in the lugs and serving in conjunction with the lugs to hold the shoe and head in connected relation, of a wear plate fitting between opposing faces of the lugs and having at the central portion thereof a pair of oppositely facing tongues extending into the aperture in the lug attached to the head and arranged to engage frictionally the sides of the key in order to hold the key against lateral displacement.

3. The combination with a brake head and shoe having a pair of apertured lugs attached respectively thereto and arranged in overlapped relation, and a key extending longitudinally between the head and shoe and through the apertures in the lugs and serving in conjunction with the lugs to hold the shoe and head in connected relation, of a wear plate of sheet steel fitting between opposing faces of the lugs and having the central portion thereof shaped and bent to form a pair of oppositely facing tongues extending into the aperture of one of the lugs and engaging frictionally the sides of the key in order to hold the key against longitudinal displacement.

4. The combination with a brake head and shoe having a pair of apertured lugs attached respectively thereto and arranged in overlapped relation, and a key extending longitudinally between the head and shoe and through the apertures in the lugs and serving in conjunction with the lugs to hold the shoe and head in connected relation, of an elongated wear plate extending transversely of the head and shoe and between opposing faces of the lugs and provided at the ends thereof with a pair of laterally extending, integrally formed spring fingers arranged to engage frictionally the ends of one of the lugs and serving to hold the plate in place and in connected relation with respect to said lug.

5. The combination with a brake head and shoe having a pair of apertured lugs attached respectively thereto and arranged in overlapped relation, and a key extending longitudinally between the head and shoe and through the apertures in the lugs and serving in conjunction with the lugs to hold the shoe and head in connected relation, of an elongated wear plate extending transversely of the head and shoe and between opposing faces of the lugs and embodying at the central portion thereof a pair of tongues for engaging frictionally the key and holding the key against longitudinal displacement, and also embodying a pair of fingers at the ends thereof for gripping the ends of one of the lugs in order to hold the plate in place.

6. The combination with a brake head and shoe having a pair of apertured lugs attached respectively thereto and arranged in overlapped relation, and a key extending longitudinally between the head and shoe and through the apertures in the lugs and serving in conjunction with the lugs to hold the shoe and head in connected relation, of an elongated wear plate extending transversely of the head and shoe and between opposing faces of the lugs and embodying at the central portion thereof a pair of tongues extending into the aperture of one of the lugs and engaging frictionally the sides of the key in order to hold the key against longitudinal displacement, and also embodying a pair of spring fingers at the ends thereof extending in the same direction as the tongues and arranged to grip the ends of the said one lug in order to hold the plate in place.

WILLIAM WRIGHT.